Dec. 11, 1934.  J. S. CLAPPER  1,983,599
TRANSPORTING TRUCK FOR POWER MOWERS
Filed Feb. 16, 1931    2 Sheets-Sheet 1
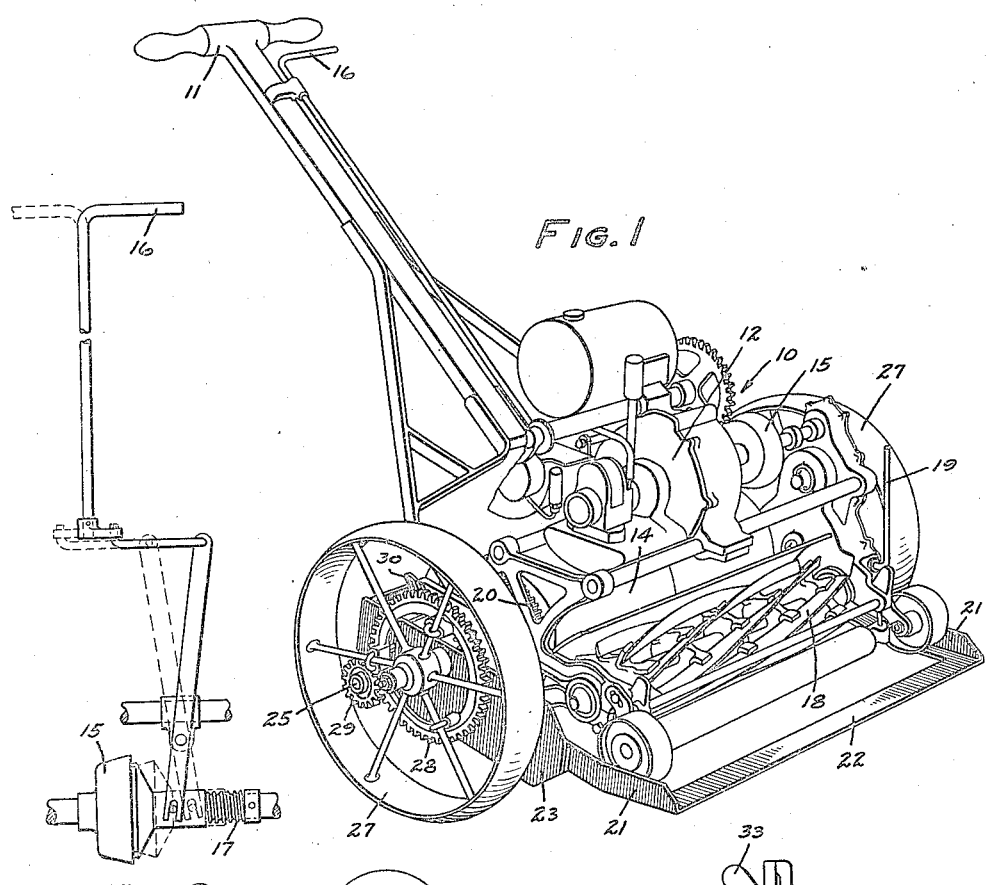
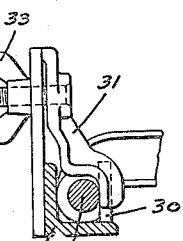
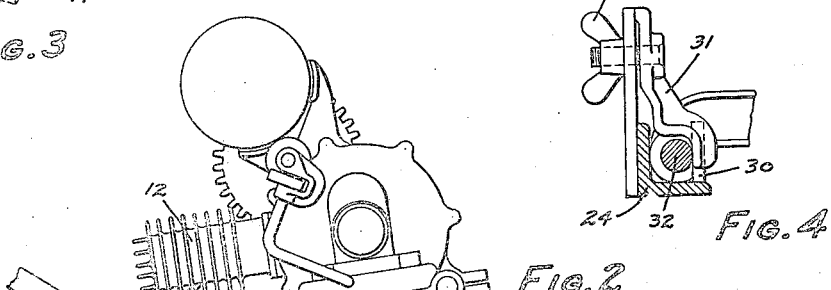
INVENTOR
JOHN S. CLAPPER
BY
ATTORNEYS Dec. 11, 1934.  J. S. CLAPPER  1,983,599
TRANSPORTING TRUCK FOR POWER MOWERS
Filed Feb. 16, 1931  2 Sheets-Sheet 2
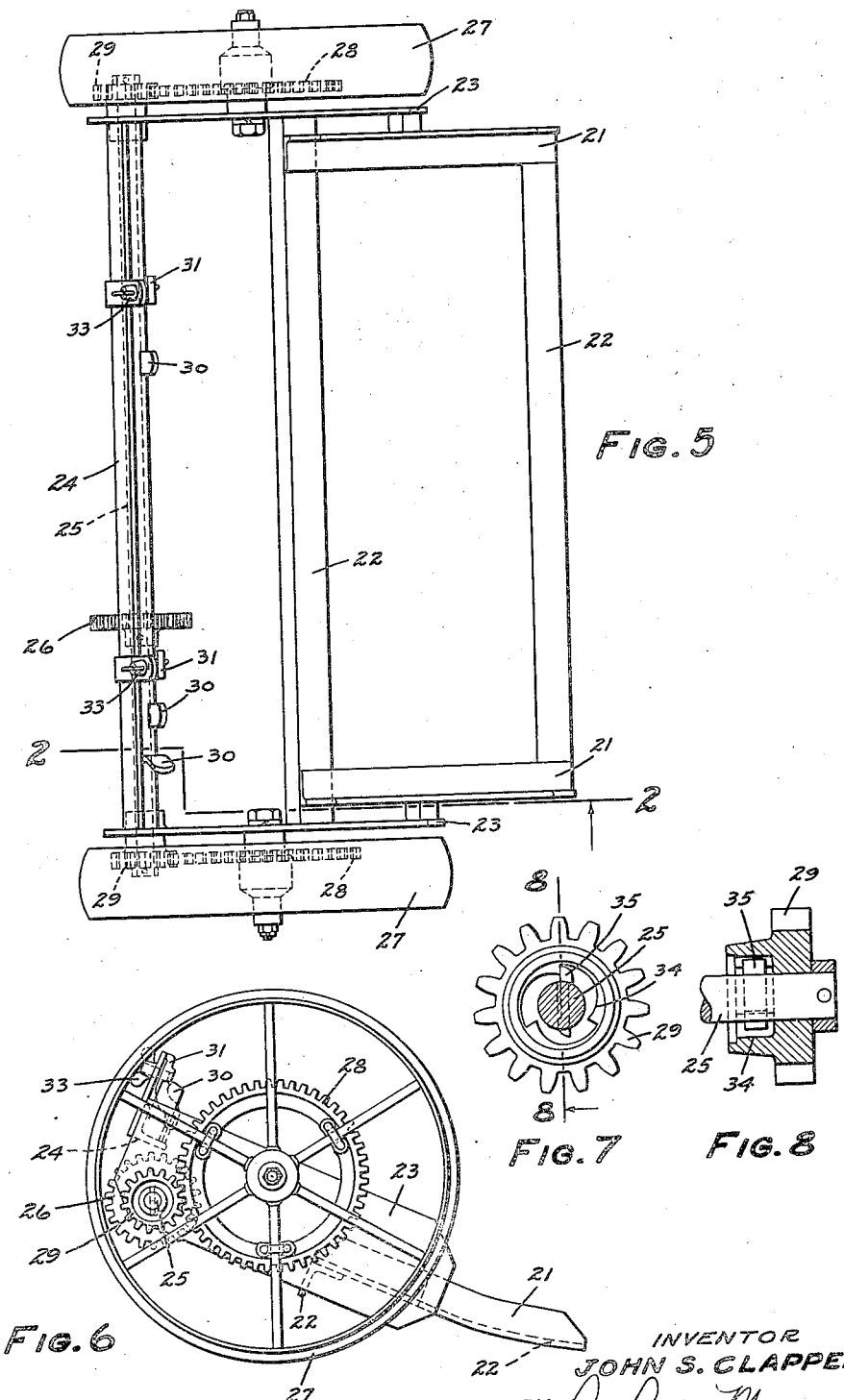

Patented Dec. 11, 1934

1,983,599

UNITED STATES PATENT OFFICE 1,983,599

TRANSPORTING TRUCK FOR POWER MOWERS

John S. Clapper, Minneapolis, Minn., assignor to Toro Manufacturing Company, Minneapolis, Minn., a corporation of Delaware Application February 16, 1931, Serial No. 515,974

5 Claims. (Cl. 180—16)

Power mowers, such as are used for mowing putting greens on golf courses, are required to produce a very fine, even and close cutting, which necessitates the maintenance of the knives in a very sharp and closely adjusted condition. Also, the adjustment of the height of the cut must be very carefully and accurately maintained in order to avoid leaving even very small ridges or unevenness in the surface of the green after mowing. In view of these requirements, it is undesirable to run such a mower on its own rolling elements over rough ground, paths or road from one putting green to another because the knives are likely to become damaged or to be jarred out of adjustment and such jarring may cause slippage of the carrying wheel adjustments which control the height and evenness of the cut.

The present invention aims to provide a solution of the foregoing problems and has for its principal object the provision of means for transporting power mowers safely from place to place without injury to the mower blades or likelihood of disturbing the adjustments thereof.

Another object is to provide a transporting truck for power driven mowers upon which the mower may be conveniently loaded and which truck is driven by power derived from the power unit of the mower.

Another object of the invention is to provide a truck for transporting power driven mowers and having traction elements with means for operatively connecting the power unit of the mower to the traction elements of the truck.

A more specific object of the invention is to provide a truck for transporting power driven mowers with means for operatively connecting the power unit of the mower by direct gear drive to the traction elements of the truck.

Other objects of the invention and the advantages thereof will more fully appear as the description proceeds.

In the accompanying drawings I have illustrated a practical embodiment of my invention; but it is to be understood that the drawings are illustrative merely and that the invention is not limited to the details of construction therein disclosed. It will be obvious that the invention is susceptible of embodiment in other forms without departing from the scope thereof as defined in the appended claims.

In these drawings:

Fig. 1 is a perspective view of a power driven mower mounted upon a transporting truck in accordance with my invention;

Fig. 2 is a sectional view taken substantially on line 2—2 of Fig. 5 showing the mower in position upon the truck;

Fig. 3 is a detail showing of the clutch associated with the power unit of the mower;

Fig. 4 is a fragmentary detail showing the means for securing the mower to the truck;

Fig. 5 is a plan view of the transporting truck with the mower removed;

Fig. 6 is a view in side elevation of the truck; and

Figs. 7 and 8 are details of the mechanism associated with a drive pinion for permitting slippage of the wheels of the truck when going around curves and under similar conditions.

In these drawings, the reference numeral 10 indicates, generally, a lawn mower which may be of any desired construction and which is provided with the usual handle 11 by which it may be guided and controlled in its movements. The mower is provided with a suitable source of power such, for example, as an internal combustion engine indicated by the reference numeral 12, which may be of any well known type of construction and which is connected through suitable transmission mechanism, not necessary to be shown in detail, to the drive shaft 13 of the traction rollers 14 of the mower. Any suitable clutch, such as the clutch 15, may be provided for establishing operative connection between the power unit and the drive shaft. The clutch is disengaged by manipulation of the lever 16 which is conveniently arranged adjacent the grips of the handle 11. The clutch, as shown in Fig. 3, is normally maintained in engagement by a suitable spring 17 and is thrown out of engagement by manipulation of said lever 16 against the action of said spring.

The lawn mower is provided with the usual cutter blades 18 mounted upon suitable carrying wheels journaled in the frame of the machine and operatively connected to the source of power whereby the cutter blades are rapidly revolved in the usual manner. In this type of machine it is desirable to provide mechanism for disconnecting the cutter blades from the source of power. Such mechanism may be of any desired form and may be operated by a suitable lever 19.

The drive shaft 13 of the mower is provided with a gear 20 through which power from the engine 12 is transmitted to the carrying truck in the manner presently to be described.

The foregoing description is directed, generally, to a type of power driven mower which may be of any desired construction and it is to be understood that the specific features of the mower form no part of the present invention but may be altered at will.

In Fig. 5, the transporting truck of my invention is shown in plan. This truck comprises side members 21 preferably made of suitable angle bars connected by cross members 22. To the side members 21 are secured extension side members 23, the rear edges of which are connected by a suitable angle-shape cross member 24.

A drive shaft 25 is journaled in the extension side members 23 and is provided with a pinion 26 which, when the mower is placed upon the truck, meshes with the gear 20 on the drive shaft of the mower.

Suitable traction wheels 27 are journaled in the side members 23 and are provided with gears 28 which mesh with pinions 29 on the ends of the said drive shaft 25.

The rear angle member 24 of the truck is provided with suitable centering and alinement lugs 30 for assuring proper positioning of the mower upon the truck so that the gear 20 will engage the pinion 26.

The rear angle member is also provided with securing clamps 31 which engage a bar or rod 32 located at the rear of the mower frame. These clamps engage the said bar 32 as shown in Fig. 4 and may be adjusted by suitable wing nuts 33.

In order to provide for ease of steering when making turns, the pinions 29 are freely mounted upon the drive shaft 25 and are provided with internal ratchets 34 which are engaged by a suitable pin 35, as shown in Figs. 7 and 8. This arrangement will permit one of the wheels 27 to travel faster than the other when the truck is going around a curve or under like circumstances.

In operation, the mower 10 is placed upon the transporting truck and is accurately alined thereon so that the gear 20 meshes with the pinion 26 on the drive shaft of the truck. The mower is then fixed in place by the clamps 31. By manipulation of the lever 19 the power unit of the mower is disconnected from the cutter carrying wheels so that the cutter blades will not be rotated during transportation of the mower. The clutch 15 being in engagement, establishes driving connection between the power unit 12 and the gear 20 which, being engaged with the pinion 26, will cause rotation of the drive shaft 25 of the truck. The pinions 29 on the shaft 25 will thereupon rotate the gears 28 which are suitably fixed to the wheels 27, whereupon the said wheels are rotated.

By the foregoing arrangement, the mower may be moved about from place to place upon the transporting truck, the handle 11 of the mower being used to guide and control the movement of the truck. Inasmuch as the mower and truck are of heavy construction, the arrangement by which the power from the mower unit is transmitted to the tractor is of great advantage since the mower power unit is thus utilized to furnish power to the truck for transportation of the mower.

I claim as my invention:

1. The combination with a mower, having a power unit, of a transporting truck for supporting and conveying said mower, a drive shaft on said mower connected to said power unit and provided with a gear, and a driven shaft on said truck provided with a pinion adapted to mesh with said gear, whereby said truck may be driven by power derived from said power unit.

2. The combination with a power driven mower of a transport truck for supporting and conveying said mower, said truck having a drive shaft provided with a pinion, a gear on said mower adapted to mesh with said pinion, and centering means for locating said mower on said truck with said gear in mesh with said pinion.

3. The combination with a power driven mower of a transport truck for supporting and conveying said mower, said truck having a drive shaft provided with a pinion, a gear on said mower adapted to mesh with said pinion, centering means for locating said mower on said truck with said gear in mesh with said pinion, and means on said truck for securing said mower in proper position thereon.

4. The combination with a power driven mower of a transport truck for supporting and conveying said mower, said truck having a drive shaft provided with a pinion, a gear on said mower adapted to mesh with said pinion, and centering means on said truck for aligning said mower thereon and for guiding said gear into mesh with said pinion.

5. A transport truck for power driven mowers comprising a frame, wheels journaled in said frame, gears connected to said wheels, a shaft extending across said frame and having pinions at its ends engaging said gears, gearing on said shaft adapted to mesh with power means on the mower, and ratchet means connecting said pinions to said shaft.

JOHN S. CLAPPER.